United States Patent Office 3,359,727
Patented Dec. 26, 1967

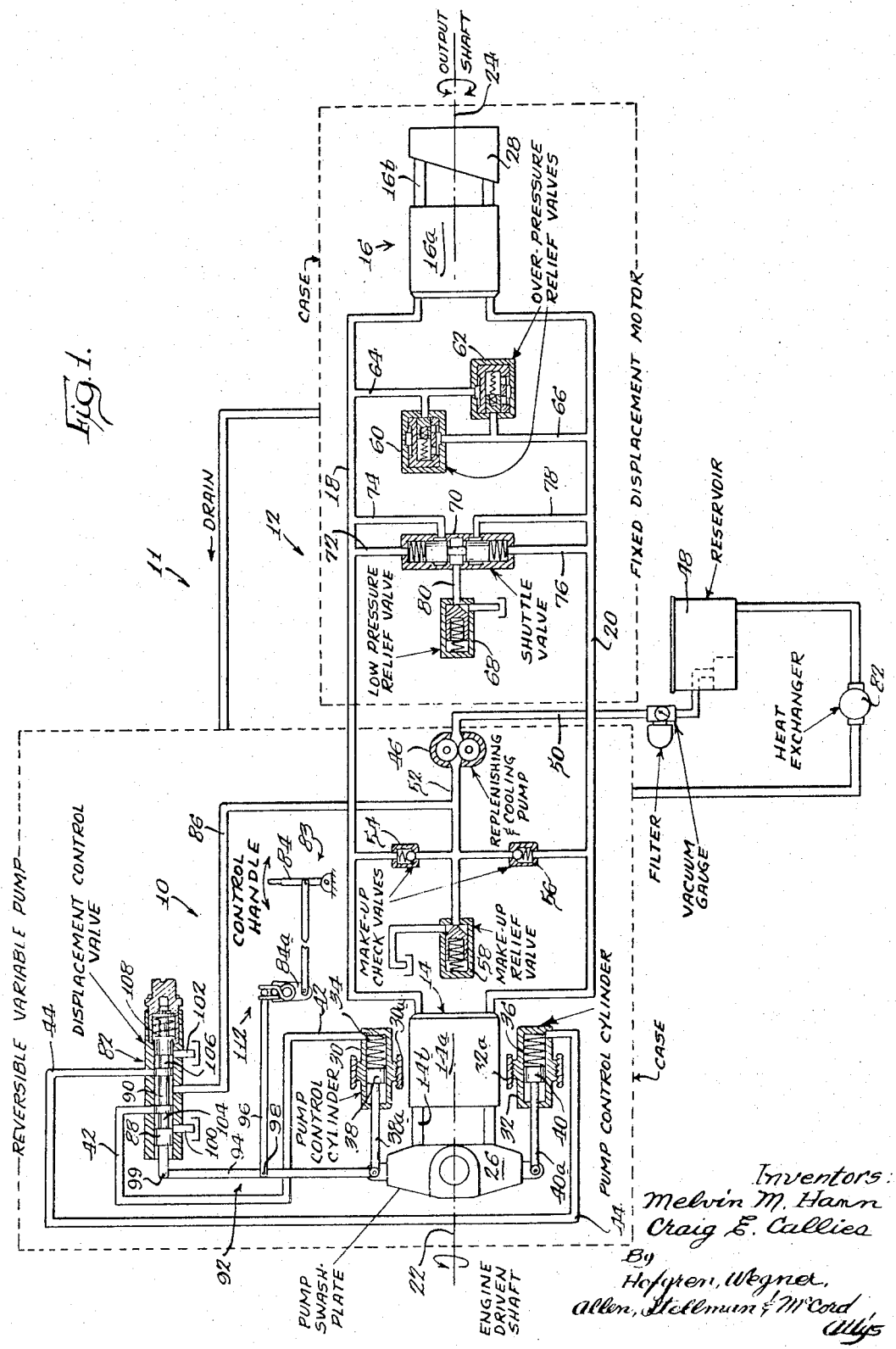

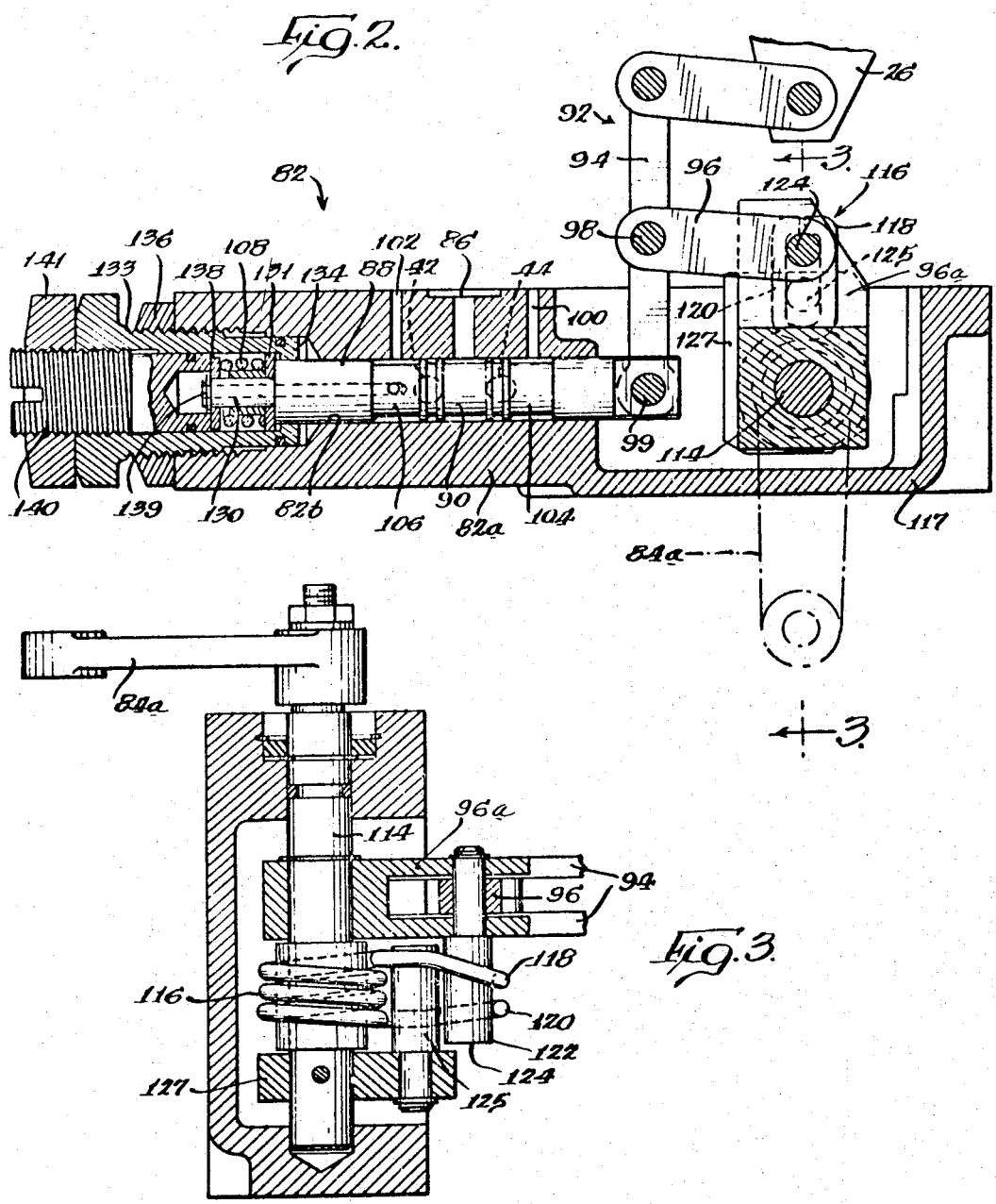

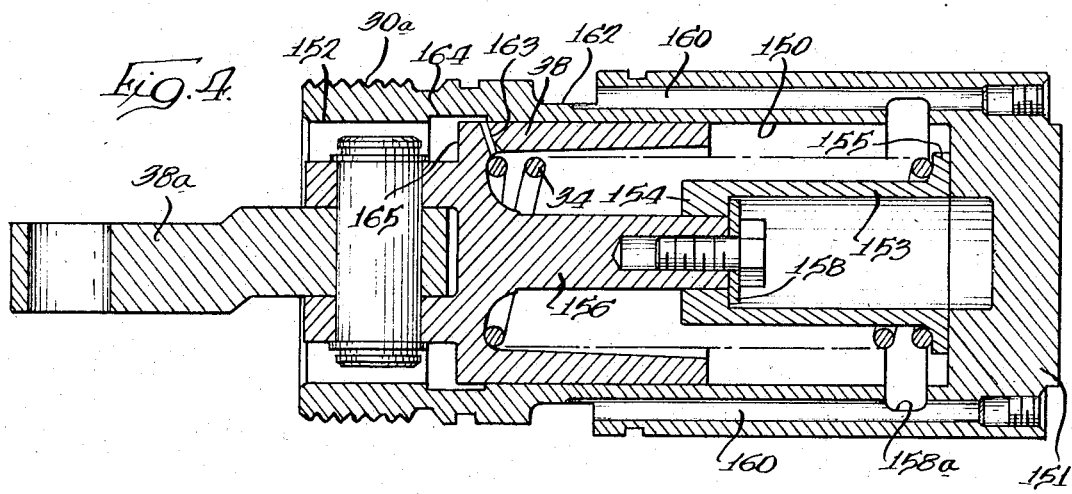
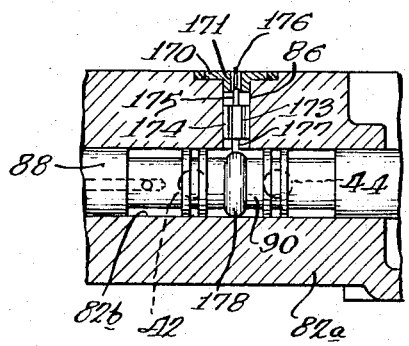
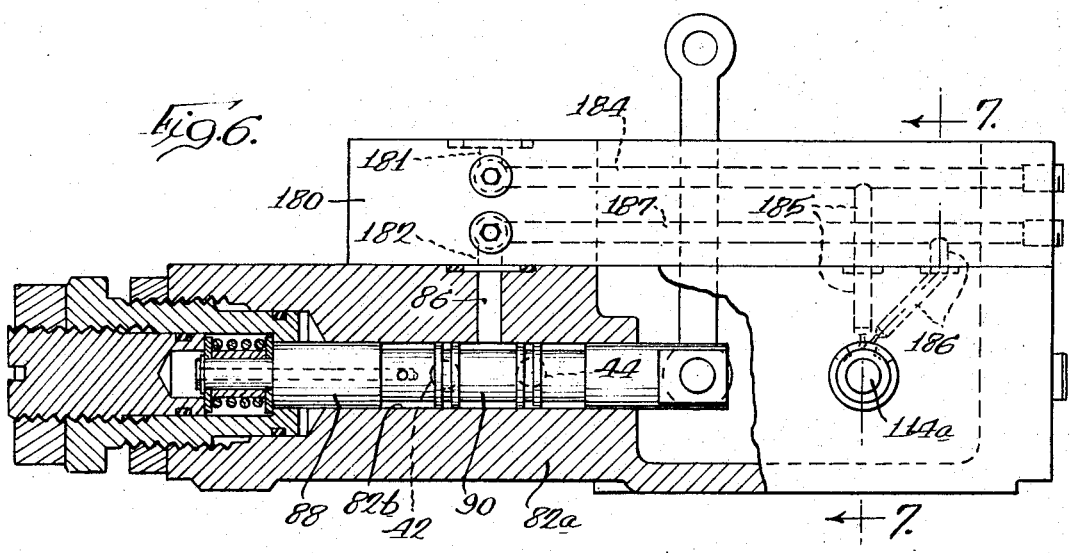

3,359,727
HYDROSTATIC TRANSMISSION
Melvin M. Hann, Ottawa, and Craig E. Callies, Peru, Ill., assignors to Sundstrand Corporation, a corporation of Illinois
Filed Apr. 6, 1966, Ser. No. 540,663
16 Claims. (Cl. 60—53)

This invention relates to hydrostatic transmissions and particularly to acceleration controls therefor.

In prior United States Patent 3,212,263, there is illustrated a hydrostatic transmission to which the improvement of this invention is applicable. Transmissions of the character mentioned are particularly useful in vehicles of the slow moving, hard woorking type, such as tractors, road graders and lift trucks, for transmitting power from the prime mover to the propulsion means for the vehicle, such as propelling wheels. In a typical embodiment, a transmission includes a hydraulic motor having an output shaft adapted to connection with the propulsion means and a pump connected in closed hydraulic circuit with the motor and adapted to be driven by the prime mover. In a preferred embodiment, the motor is a fixed displacement type and the pump is adapted to have its displacement varied in opposite directions from neutral in order to drive the motor in opposite directions from standstill. In order to vary the displacement of the pump appropriately, a fluid operable displacement varying means is controlled by a manually operable displacement control valve movable in opposite directions from neutral. Preferably, a resilient motion-transmitting means connects a manual handle to the movable member of the displacement control valve and a feedback linkage connects the swashplate of the pump to the movable displacement valve member to close the valve when the selected displacement is attained.

In some vehicles where precision in the control of acceleration from standstill and deceleration to standstill is not a critical factor, transmission controls of the type illustrated in the prior patent are desirable. However, in some vehicles, such as lift trucks, which may be heavily loaded with weights approaching the weight of the vehicle in precariously balanced arrangements, it is desirable to provide a very precise control of acceleration, and sometimes deceleration, in order not to disturb or upset the load carried by the vehicle. In such vehicles, there should be the capability of starts without perceptible jerks, the capacity for creeping at very slow and infinitely variable rates, and yet when under way in less delicate situations, the transmission should be capable of lively response.

As disclosed in the prior patent, it is possible to regulate the over-all response of the transmission to operate consistently throughout the range of variations in transmission ratio by providing a fixed orifice in the control fluid circuit, between a source of control fluid and the fluid operable displacement varying means. In this way, a particular installation may be limited to a relatively slow rate of acceleration, or it may be provided with a relatively rapid rate of acceleration. However, such fixed orifices impose a limitation on the system that the selected rate of acceleration provided by the chosen orifice applies throughout the range of operation.

It is an object of this invention to provide a new and improved acceleration control for a hydrostatic transmission which facilitates a relatively slow rate of acceleration in the range of operation immediately adjacent standstill, but permits a more lively rate of acceleration after the vehicle is under way.

Another object is to provide a new and improved acceleration control including means for limiting a pressure or flow characteristic of cotnrol fluid at the fluid operable displacement varying means on initial movement of the displacement control valve from a neutral position toward a maximum displacement position to limit acceleration together with means responsive to operation of the manual valve control after initial movement for increasing the pressure or flow characteristic of a control fluid at the fluid operable displacement varying means.

A more specific object is to provide a new and improved acceleration control of the type described including a bleed orifice or port in a piston and cylinder device coitrolling the pump swashplate and connected to drain to limit the rate of piston movement during an initial portion of the stroke from neutral to full displacement, the bleed port being closed after a predetermined initial piston movement to increase the rate of piston movement permitted.

A further object is to provide a new and improved acceleration control of the character mentioned including a variable orifice means between a source of control fluid and the displacement control valve, effective to limit the rate of flow to the fluid operable displacement varying means on initial movement of the valve member and controlled by the valve member to increase the rate of flow of control fluid after initial valve movement.

In the acceleration controls referred to in the two objects immediately preceding, there is the characteristic that while the acceleration control minimizes acceleration from standstill, it also minimizes deceleration to standstill, imposing a limitation on the capacity to stop quickly in some situations, where quick stops may be desired in some vehicles.

It is a further object to provide a new and improved acceleration control which has the capacity for limiting the rate of acceleration from standstill while still permitting rapid deceleration to standstill.

Other objects and advantages will become readily apparent from the following detailed description taken in connection with the accompanying drawings, in which:

FIG. 1 is a diagrammatic illustration of a hydrostatic transmission which may embody the principles of this invention;

FIG. 2 is an enlarged sectional view of the displacement valve illustrated diagrammatically in the circuit of FIG. 1;

FIG. 3 is an enlarged sectional view of the control handle means for the displacement valve, taken at about line 3—3 of FIG. 2;

FIG. 4 is an enlarged sectional view illustrating details of one of the piston and cylinder devices controlling the pump swashplate and embodying an acceleration control;

FIG. 5 is a fragmentary sectional view of a displacement control valve similar to that in FIG. 2, including a second embodiment of an acceleration control;

FIG. 6 is a view of the displacement control valve, partly in section and partly in elevation, illustrating a third embodiment of an acceleration control;

Figure 7:
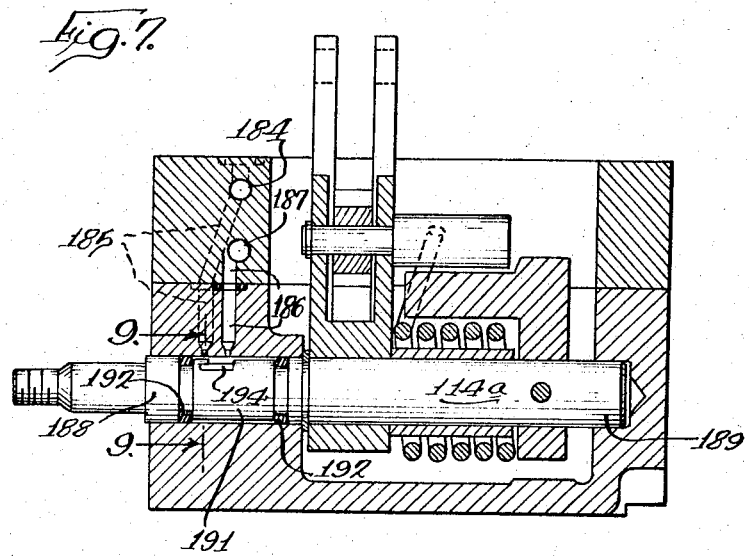
FIG. 7 is a sectional view taken at about the line 7—7 of FIG. 6.

While illustrative embodiments of the invention are shown in the drawings and will be described in detail herein, the invention is susceptible of embodiment in many different forms, and it should be understood that the present disclosure is to be considered as an exemplification of the principles of the invention and is not intended to limit the invention to the embodiments illustrated. The scope of the invention will be pointed out in the appended claims.

Referring now to the drawings, a control means 10 is provided with a hydrostatic transmission 11 including a closed hydraulic circuit 12 having an engine driven pump 14 and a motor 16 supplied by the pump. The pump and motor are hydraulically connected by conduits 18 and 20 to establish a closed transmission circuit for pumping the hydraulic fluid from the pump 14 to the motor 16. The drive output of an engine (not shown) is transmitted to the pump through a suitable shaft represented diagrammatically at 22. The output of the motor is transmitted to the driving wheels or tracks of the vehicle by means of a suitable shaft represented diagramatically at 24.

Preferably both the pump and motor are of an axial piston type having rotatable cylinder blocks 14a and 16a, respectively, each with a plurality of cylinders in annular array and reciprocal pistons 14b and 16b, respectively, having ends reciprocating in the cylinders. The pump 14 has a variable angle reversible swashplate 26 engaged by projecting ends of pistons 14b for controlling the speed of the transmission as well as the direction thereof. The motor has a fixed displacement inclined cam plate 28 engaged by the pistons 16b.

For positioning the pump swashplate, two pump control cylinders 30 and 32 are provided. The pump control cylinders 30 and 32 house centering springs 34 and 36, respectively, and include pistons 38 and 40 on rods 38a and 40a, respectively, which are pivotally secured to the swashplate for positioning the same in response to supply of control fluid to the cylinders by means of conduits 42 and 44, respectively. The springs normally act through the pistons to position the pump swashplate as shown in FIG. 1 in a position of minimum displacement so that there is no positive output from the pump and the cylinders are adjustably threadably mounted as at 30a and 32a for longitudinal movement to properly compress the springs and assure exact neutral. The control cylinders are a conventional single action type so that the influx of fluid under pressure in one cylinder will cause the swashplate to tilt or pivot in a given direction and the influx of fluid under pressure in the opposite cylinder will cause the reverse tilting so that movement in opposite directions may be imparted to the motor and thus to the vehicle being driven thereby.

A positive displacement gear-type replenishing and cooling pump 46 is provided and is driven by suitable means by the engine or prime mover for this transmission. The replenishing and cooling pump is in communication with a reservoir 48 through an intake conduit 50 for supplying replenishing and cooling fluid to the system through the replenishing and cooling conduit 52. The capacity of the pump is sufficient to replace leakage fluid, to supply control fluid to the valve and to supply cooling fluid to the circuit in excess of that required for the aforementioned purposes in order to maintain the transmission cool.

A pair of spring-biased check valves 54 and 56 are in communication with the conduit 52 and with the conduits 18 and 20, respectively, for supplying the replenishing and cooling fluid to the low pressure side of the circuit through one check valve while pressure in the high pressure conduit will maintain the other check valve closed. A spring-biased makeup relief valve 58 communicates wtih the conduit 52 and serves to relieve excess fluid.

For establishing a circuit between the main line 18 or 20 that is at low pressure and a low pressure relief valve 68, a shuttle valve 70 is provided. The shuttle valve is in communication with the conduits 18 and 20 by means of the conduits 72–74 and 76–78, and provides a means for removing heated oil displaced by cooling oil supplied by replenishing pump 46. The fluid pressure in the conduits 18 and 20 acts through conduits 72 and 76, respectively, to appropriately position the shuttle valve so that communication is established from the low pressure relief valve through a conduit 80 to the low pressure side of the transmission circuit, by means of either the conduit 74 or the conduit 78 so that the heated fluid may be drained to the reservoir therefrom, passing through the heat exchanger 82. Shuttle valve 70 is spring-centered to a closed position so that during the transition of reversing of pressure in the main lines none of the high pressure oil is lost from the circuit.

The transmission includes overpressure relief valves 60 and 62 in communication with each of the main conduit lines by means of the conduits 64 and 66, respectively. The valves serve to prevent abnormally high pressure in either of the two main hydraulic lines 18 and 20 by relieving the circuit of surge pressures which may occur during rapid acceleration or abrupt braking. In response to this high pressure, the overpressure valves shift to dump the excess oil to the low pressure side of the transmission circuit. For example, when high pressure exists in line 18, then fluid through conduit 64 will cause valve 60 to shift to shunt the fluid to line 20 through conduit 66.

The control unit 10 includes a displacement control valve 82 and control handle assembly 83 having a control handle 84 for appropriately positioning the control valve. The control handle assembly is provided with conventional frictional retention means for maintaining the handle in any preselected position to which it is manually moved. The control valve is a spring-centered four-way valve in communication with control fluid by means of the conduit 86. The valve includes a valve stem 88 having reduced diameter portions such as 90. The valve stem is operatively associated with the control handle through linkage means 92. Linkage means 92 includes a valve-to-swashplate link 94 which is pivoted at one end to the valve stem 88 and pivoted at the other end to the swashplate 26. Intermediate the aforementioned pivotal securements, a control handle link 96 is piovtally secured to the link 94 at 98 so that movement of the control handle will appropriately position the valve stem for appropriate metering of fluid through the valve.

As shown in FIG. 2, control valve 82 is in a neutral or centered position so that control fluid from the pump by way of conduit 86 enters the valve, and while capable of flowing past the reduced diameter portion 90 of valve stem 88, it is blocked by lands of stem 88 from passing out of the valve through either the conduit 42 or 44 so that no fluid may be supplied to the pump control cylinders. However, the conduits 42 and 44 from the pump control cylinders are in communication with drain conduits 100 and 102 by way of the valve stem reduced portons 104 and 106, respectively.

Movement of the control handle 84 imparts the desired directional movement to the vehicle. If, for example, the control handle is moved to the right as shown in FIG. 1, the link 96 will move to the left, thereby moving the valve stem 88 to the left as the link 94 pivots about the end of the swashplate. The control handle is provided with suitable friction means so that it is retained in selected positions. As the valve stem moves to the left, communication is established around the reduced portion 90 between the conduit 86 and the conduit 42 supplying control fluid to the pump control cylinder 30 causing the pump swashplate to pivot in a counterclockwise direction. The pump control cylinder 32 is still connected to drain 102 through the conduit 44 and reduced portion 106.

As the swashplate tilts in a counterclockwise direction, the link 94 pivots clockwise about the point 98 because the link 96 is stationary due to the frictional retention of the control handle 84 in the selected position. Movement of swashplate 26 creates a feedback signal to valve 82. That is, pivoting of the link 94 about the point 98 causes the valve stem 88 to be moved to the right, toward the original neutral position. However, as the valve stem moves to the right, the flow of control fluid to cylinder 30 will be blocked by the valve stem thus shutting off the supply of additional control fluid to the pump control cylinder 30. The termination of the supply of control fluid to the cylinder also terminates the further movement of the swashplate thereby halting further movement of the valve stem. Thus, the valve achieves a closed position blocking the flow of control fluid to or from the control cylinder which is acting to displace the swashplate so that further swashplate displacement in either direction is prevented. Handle 84 remains in the position to which it has been moved until it is moved again by the operator. If the swashplate overshoots, the feedback signal to the valve calls for adjustment of the swashplate to correctly position it. Upon returning the control handle 84 to neutral, valve stem 88 is moved so that communication is established between the conduit 42 and drain conduit 100 by the reduced portion 104, draining the control fluid from the cylinder 30 while control fluid is supplied to cylinder 32 through reduced portion 90 to return the swashplate to an upright or neutral position as shown in FIG. 1.

The connection for the control handle to the link 96 is illustrated in further detail in FIG. 3. It is to be noted that there is a yieldable connection between the control handle and the valve member so that excess forces applied to the control handle will not be transmitted to the valve member. In particular, the yieldable connection indicated generally at 112 is between the control handle and the linkage 96 for moving the valve member. The control handle 84 is adapted to be suitably connected to a control arm 84a secured to one end of a control shaft 114. The shaft 114 has concentrically mounted thereon a coiled torsion spring 116 having outwardly projecting terminal fingers 118 and 120 at opposite ends thereof which tend to move toward each other but may be moved apart. Shaft 114 is pivotally mounted in a bracket extension 117 of valve housing 82a. The fingers 118 and 120 are offset axially from each other as well as being spaced relative to each other circumferentially, and a pair of pins 124 and 125 are positioned therebetween. Pin 124 is secured in the link 96 and in an arm 96a free on shaft 114, and pin 125 is secured in bracket 127 which is pinned to shaft 114. As the valve control handle 84 is moved, the shaft 114 will be turned and pin 125 will bear against either the finger 118 or 120. The other finger of spring 116 will resiliently urge against the pin 124 for moving the link 96 in the desired direction. Normally, the spring transmits motion as a rigid member.

The torsion of the spring is such that the handle 84 is moved sufficiently to jam the valve stem 88 to the limit of its permissible movement. The spring 116 will yield in response to the opposition offered by the valve stem so that the handle movement is not transmitted directly to the valve member. Thus, rather than permit the excess of force to be transmitted to the valve stem where it may cause damage thereto, such excess force is absorbed in the spring 116.

Referring to FIG. 2, it should be noted that the valve body 82a has a main valve bore 82b and a counterbore at the left end to facilitate assembly of the valve apparatus. Valve stem 88 has a reduced end portion 130, and a collar 131 is slidably mounted on the reduced portion and adapted to abut the shoulder between the reduced portion 130 and the main valve stem 88. In assembly, the valve stem 88 is positioned in the valve bore 82b, after which a valve sleeve 133 is threadably inserted into the valve counterbore with a terminal portion 134 slidably receiving the valve stem 88. The threaded member 133 is preferably locked into position by a lock nut 136.

The collar 131 on the reduced stem portion 130 provides a spring seat against which one end of the coiled compression spring 108 bears. The other end of the spring bears against a spring seat 138 in the form of a washer or collar retained on the reduced stem portion 130 as by a snap ring 139. The spring seat 138 is normally abutted by a stop 140 threadably adjustable in sleeve member 133 and preferably held by lock nut 141.

In operation, if the valve member 88 is moved to the left as viewed in FIG. 2, the spring seat 138 engages stop 140 so that spring 108 is compressed as the seat 131 moves to the left in contact with the shoulder on the valve stem.

If the valve stem is moved toward the right, the spring seat 131 engages the inner annular shoulder on the terminal portion 134 of sleeve 133, so that the spring is compressed as the seat 138 moves toward the right.

The valve stem movement in opposite directions from the neutral center position illustrated is terminated when the spring 108 is fully compressed and is obviously quite limited.

Advantages of the construction described in detail thus far and found in the prior patent referred to include the yieldable connection 116 between the operator's handle and the valve stem, the provision of centering springs as at 34 and 36 insuring a positive neutral for the pump swashplate, and centering spring 108 for the displacement control valve member insuring a positive neutral for the valve member in spite of wear and tolerances.

As mentioned in the prior patent, the conduit 86 seen in FIGS. 1 and 2 may be provided with a suitable fixed orifice in order to limit the rate of flow of control fluid and thereby limit the rate of response of the transmission to directions calling for acceleration. However, such a fixed orifice provides for a similar response in the transmission throughout the entire range of operation rather than providing for a soft or slow response during initial starting and a more lively response at other times.

In order to provide for limited acceleration of the vehicle from standstill, this invention contemplates an acceleration control means illustrated in a first embodiment in FIG. 4, which is an enlarged view representative of either of the pump swashplate control cylinders 30 and 32, but which for purposes of simplicity will be referred to hereinafter as the cylinder 30 with the understanding that the other may be similarly constructed.

Referring to FIG. 4, cylinder 30 has a bore 150 in which piston 38 is reciprocably mounted. The latter is connected to a link 38a adapted to be pivotally connected to one side of the pump swashplate. The right end of cylinder bore 150 is closed by an integral cylinder end portion 151 while the left end of the cylinder bore is open at 152 to the interior of the pump casing. Spring 34 is seated at the left end against the interior of the piston 38 and at the right end against a spring seat 153 having an outwardly extending annular flange 155 engaging the spring. Spring seat member 153 has an inwardly turned flange portion 154 slidable on a central piston stem 156 and urged to the right against a retaining ring 158 on the stem 156. The arrangement is such that with the flange 155 seated against the cylinder end 151, the spring 34 urges the piston 38 to the left. On admission of fluid to the right end of cylinder bore 150, the piston is moved toward the left against the spring in the other control cylinder which serves to return the piston 38 to the position illustrated when fluid is exhausted from the bore 150. Conversely, if fluid is admitted to the other control cylinder, the piston 38 moves to the right in the bore 150 against the bias of spring 34, while the spring seat flange 154 slides on the stem 156. When fluid is exhausted from the other cylinder, the spring 34 returns the piston 38 toward the position illustrated.

In order to admit fluid to the right end of the cylinder bore 150, the cylinder is provided with an internal annular groove 158a which intersects one or more longitudinal bores as at 160 in the cylinder wall. The left end of the bore or bores 160 intersects an outer annular groove 162 on the cylinder wall to which control fluid under pressure is appropriately ported as through the passage 42.

In order to limit acceleration of the vehicle from standstill, control is exercised over a pressure characteristic or a flow characteristic, or both, of the control fluid delivered to the piston and cylinder device for varying displacement. In FIG. 4, the pressure in the right end of cylinder bore 150 is limited during initial movement of the piston by means of a bleed orifice 163 leading from the interior of the piston to the exterior of the piston and registering with an internal annular groove 164 in the cylinder bore when the piston 38 is positioned in neutral as illustrated. At the same time, the end of the piston 38 at 165 is positioned about midway the length of the annular groove 164 so that part of the fluid admitted to the cylinder bore 150 is bled off through the orifice 163, limiting the rate of piston movement. After a limited movement of the piston, shown herein to be about half the length or width of the internal groove 164, the end of the piston 165 passes the edge of the groove 164, cutting off the bleed from the cylinder bore 150 and thereafter permitting a more rapid rate of acceleration. Similarly, on deceleration, as the piston returns to neutral position, there is a bleeding of pressure from the orifice 163 also limiting the rate of deceleration.

The control illustrated in FIG. 4 has the advantage of utmost simplicity.

In the embodiment of FIG. 5, the passage 86 in the valve body 82a is provided with a hat-shaped insert 170 having a central fixed orifice 171 between the source of control fluid and the valve bore 82b. In lieu of the bleed port in the piston and cylinder device as described in connection with FIG. 4, means is provided for varying the effective area of the orifice 171 in the form of a valve plunger in the bore 86 having a main body 173 provided with one or more longitudinal grooves 174 which permit full flow of control fluid so long as the area of the orifice 171 is not restricted. In order to restrict the effective area of the orifice 171, the main plunger body 173 has a reduced needle-like extension 175 adapted to move into and out of the orifice 171 under control of an opposite reduced end portion 177 which functions as a cam follower engaging a cam lobe 178 on the central reduced portion 90 of displacement control valve stem 88. If desired, extension 175 may include an even smaller guide or pilot end portion 176. The lobe 178 may be of annular shape as illustrated with a reduced diameter relative to the lands controlling ports 42 and 44, or it may be merely a localized lobe.

In operation, with the valve stem 88 in the central neutral position, the cam lobe 178 engages the plunger extension or cam follower 177, pushing the restrictor 175 into the orifice 171, thereby limiting the rate of flow of control fluid from the charge pump to the displacement control valve. It will be understood that as the valve member 88 is moved in either direction from neutral, flow of control fluid through the displacement valve is limited while the plunger end 175 restricts the flow through orifice 171. After initial movement from neutral, the cam follower portion 177 drops off the lobe 178, opening the orifice 171 and permitting full flow of control fluid.

While the control device of FIG. 5 has the advantage of being a relatively simple modification of the control of the prior patent, like the device of FIG. 4, it also has the characteristic of limiting deceleration to standstill where the capacity of rapid deceleration may in some vehicles be desirable. Further, each time the swashplate attains the position dictated by the control handle, the feedback signal from the swashplate positions the valve stem 88 closely adjacent to the neutral position illustrated, so that to subsequently increase the pump swashplate angle for greater vehicle speed, the transmission again passes through a stage in which the rate of acceleration is limited, where such function may not be desired in all vehicles.

In the embodiment of the control illustrated in FIGS. 6–9, a device is provided in which the acceleration control is positioned proportional to the movement of the manually operable handle or pedal in which the acceleration from standstill is appropriately limited, and in which deceleration to standstill is not similarly limited and may be achieved as rapidly as desired, permitting stopping quickly and in the place desired whether the vehicle is lightly loaded or heavily loaded.

Referring to FIG. 6, in lieu of the bleed port 163 of FIG. 4 and in lieu of the variable restricter 175 in FIG. 5, the control device includes a port block 180 positioned adjacent the valve housing 82a and provided with an inlet 181 adapted to receive control fluid from the charge pump and divert it through a variable orifice between the charge pump and the displacement control valve before supplying the fluid through an outlet 182 to the bore 86 in the displacement control valve block 82a. More particularly, the inlet 181 communicates with a passage 184 which intersects a passage 185 in the blocks 180 and 82a leading to a control handle shaft 114a modified as compared to the shaft 114 illustrated in FIG. 3 to provide variable restriction in turn communicating with a return passage 186 in the two blocks intersecting a passage 187 in the block 180 communicating with the outlet 182 to bore 86.

Referring to FIG. 7, the shaft 114a has opposite end portions 188 and 189 which support the shaft appropriately for pivotal movement, and an intervening slightly reduced portion 191 suitably sealed as by O-rings 192.

Figure 8:
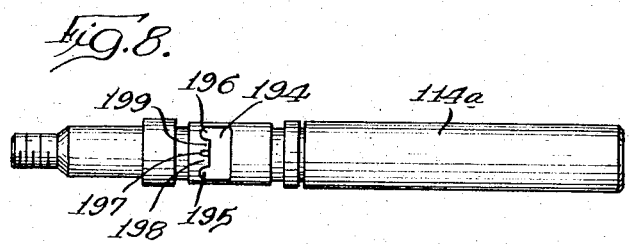
FIG. 8 is a top plan view of the control handle shaft of FIGS. 6 and 7.
Figure 9:
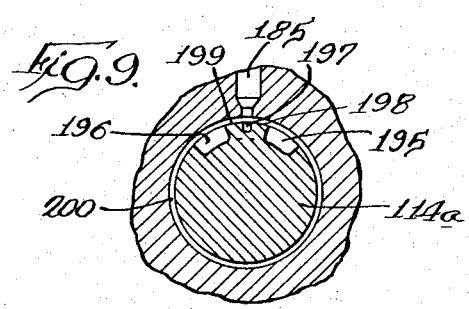
FIG. 9 is an enlarged cross sectional view of the control handle shaft.

Referring to FIGS. 8 and 9, the top of the shaft 114a has a recess portion somewhat in the form of a backward E including a main portion 194 communicating with passage 186, opposite end leg portions 195 and 196 adapted to communicate with the passage 185 on rotation of the shaft 114 in opposite directions from neutral, and a center leg portion 197 which comunicates with the passage 185 when the shaft 114a is in the central neutral position illustrated.

Between the portion 197 and the portion 195 and 196, there are land portions 198 and 199.

In operation, the reduced portion 191 of the shaft has a limited clearance in its mounting bore as illustrated at 200, so that when either of the land portions 198 and 199 is positioned to register with the passage 185, there is a restricted flow from the passage 185 to the passage 186 by virtue of the clearance 200 between the shaft portion 191 and the bore in which it is mounted. Thus, on initial movement of the handle from neutral toward a maximum displacement position in either direction, the rate of fluid flow from the charge pump to the displacement control valve is limited until the land passes the passage 185 and one of the recess portions 195 and 196 places the passage 185 in direct and full communication with the passage 186. The restriction referred to provides for limited acceleration on initial start-up from standstill, but after the initial period of limitation on acceleration, no further limit is exercised by the variable control.

One deceleration, when the shaft 114a is returned to the neutral position illustrated after passing either of the land portions 198 and 199, the central recess portion 197 permits normal flow through the variable control enabling control fluid to the piston and cylinder devices controlling the pump swashplate in a manner to permit rapid deceleration if desired and a stopping at a desired place whether the vehicle is lightly loaded or heavily loaded.

We claim:
1. In a hydrostatic transmission for a vehicle,
 (a) a pump adapted to be driven by a prime mover,
 (b) a motor connectible to drive the vehicle,
 (c) conduits connecting the pump outlet to the motor inlet and connecting the motor outlet to the pump inlet,
 (d) means for varying the displacement of the pump from neutral to a maximum value to bring the transmission from standstill up to speed,
 (e) a fluid operable device for actuating the displacement varying means,
 (f) means providing a source of control fluid under pressure,
 (g) a displacement control valve controlling flow of control fluid from the source to the fluid operable means,
  (g-1) including a valve member movable from a first position exhausting the fluid operable de- vice, to a second position supplying fluid to the device,
(h) manually operable means connected to effect movement of the valve member,
(i) means for limiting a pressure or flow characteristic of control fluid delivered to the fluid operable device on initial movement of the valve member from the first position toward the second position to limit starting acceleration to a rate sufficiently low to prevent abrupt starts, and
(j) means responsive to movement of the manually operable means after initial movement in a manner to move the valve member from the first position toward the second position for disabling the limiting means.

2. A combination as defined in claim 1, wherein
(k) said limiting means comprises valve means additional to the valving in the displacement control valve required to supply and exhaust the fluid operable device, and
(l) said responsive means is constructed to adjust said valve means.

3. A combination as defined in claim 2, wherein
(m) said responsive means is constructed for operation by said valve member.

4. A combination as defined in claim 1, wherein
(k) said limiting means comprises valve means located for limiting the rate of flow of control fluid relative to the displacement control valve.

5. A combination as defined in claim 4, wherein
(l) the valve means is located between the source and the displacement control valve.

6. A combination as defined in claim 4, including
(l) resiliently yieldable means connecting the manually operable means and the displacement control valve member, and
(m) a feedback linkage connecting the displacement varying means and the displacement control valve member to return the latter to neutral when the displacement varying means attains the position called for.

7. A combination as defined in claim 4, wherein
(l) said valve means comprises an orifice and a valve plunger movable relative to the orifice, and
(m) said responsive means comprises a cam on said valve member and a cam follower on said valve plunger.

8. A combination as defined in claim 7, including
(n) resiliently yieldable means connecting the manually operable means and the displacement control valve member, and
(o) a feedback linkage connecting the displacement varying means and the displacement control valve member to return the latter to neutral when the displacement varying means attains the position called for.

9. A combination as defined in claim 1, wherein
(k) said limiting means comprises valve means in said fluid operable device for bleeding fluid from the device to drain.

10. A combination as defined in claim 9, wherein,
(l) said fluid operable device comprises a piston movable in a cylinder, and
(m) said responsive means is constructed for operation by said piston.

11. A combination as defined in claim 10, including
(n) resiliently yieldable means connecting the manually operable means and the displacement control valve member, and
(o) a feedback linkage connecting the displacement varying means and the displacement control valve member to return the latter to neutral when the displacement varying means attains the position called for.

12. A combination as defined in claim 10, wherein
(n) said valve means comprises a radial port through said piston, an annular groove in said cylinder communicating the port with drain when the piston is in neutral position, and land means on the piston for blocking the groove after predetermined initial movement of the piston.

13. A combination as defined in claim 1, including
(k) means providing for unlimited deceleration on return of the manually operable means to neutral.

14. A combination as defined in claim 4, wherein
(l) said valve means includes valving providing unlimited flow relative to the displacement control valve on return of the manually operable means to neutral to permit unlimited deceleration.

15. A combination as defined in claim 14, wherein
(m) said manually operable means includes a rotatable shaft, and
(n) said valve means is located between the source and the displacement control valve and controlled by said rotatable shaft.

16. A combination as defined in claim 15, including
(o) resiliently yieldable means connecting the manually operable means and the displacement control valve member, and
(p) a feedback linkage connecting the displacement varying means and the displacement control valve member to return the latter to neutral when the displacement varying means attains the position called for.

No references cited.

EDGAR W. GEOGHEGAN, *Primary Examiner.*

UNITED STATES PATENT OFFICE
CERTIFICATE OF CORRECTION

Patent No. 3,359,727 December 26, 1967

Melvin M. Hann et al.

It is certified that error appears in the above identified patent and that said Letters Patent are hereby corrected as shown below:

In the heading to the printed specification, line 5, Illinois" should read -- Delaware --.

Signed and sealed this 10th day of March 1970.

(SEAL)
Attest:

Edward M. Fletcher, Jr.

Attesting Officer

WILLIAM E. SCHUYLER, JR.

Commissioner of Patents